United States Patent [19]
Hoffstetter

[11] 3,835,721
[45] Sept. 17, 1974

[54] CHAIN CONSTRUCTION

[76] Inventor: George O. Hoffstetter, 999 W. Lake Dr., Jerseyville, Ill. 62052

[22] Filed: Nov. 21, 1972

[21] Appl. No.: 308,486

[52] U.S. Cl............................................. 74/245 R
[51] Int. Cl............................................. F16g 13/02
[58] Field of Search...................... 74/245 R, 255 R

[56] References Cited
UNITED STATES PATENTS 2,715,340   8/1955   Acri................................. 74/245 R
2,778,481   1/1957   Brooks........................... 74/245 R X Primary Examiner—Leonard H. Gerin
Attorney, Agent, or Firm—Paul M. Denk

[57] ABSTRACT

In a chain, comprising a series of links pivotally held together by means of a pin to provide for flexibility of use, a spacer is provided intermediate each linking member held together by said pin for the purpose of preventing their contiguous contact.

7 Claims, 6 Drawing Figures

PATENTED SEP 17 1974　　3,835,721
FIG.1　FIG.2　FIG.3
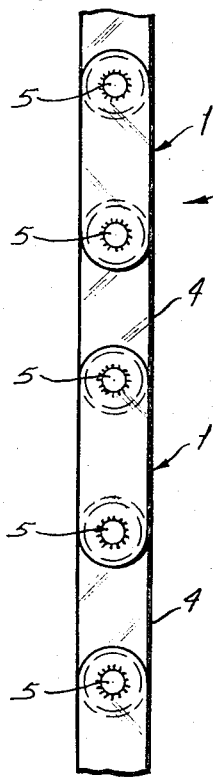
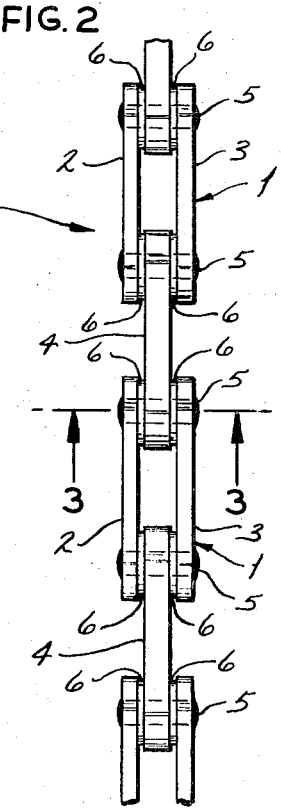
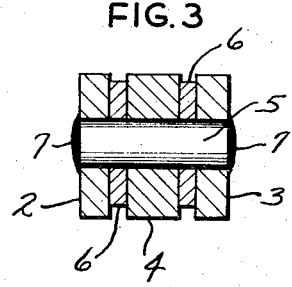
FIG.4　FIG.5　FIG.6
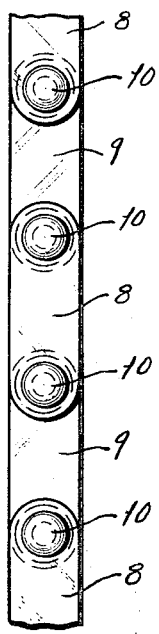
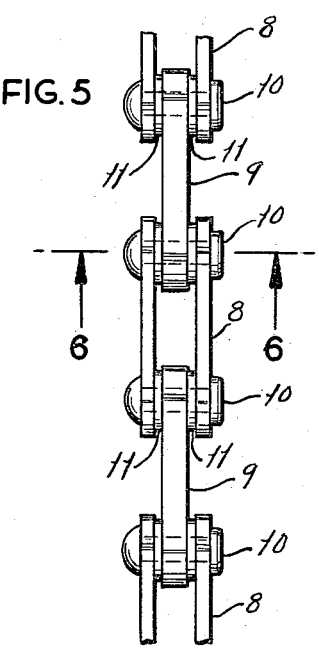
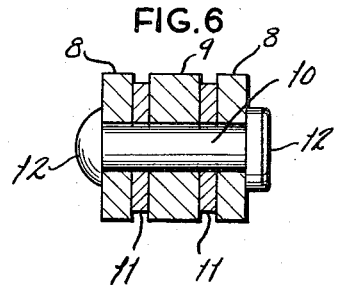

3,835,721

CHAIN CONSTRUCTION

BACKGROUND OF THE INVENTION

This invention relates generally to a link type chain, and more particularly, concerns the construction of a link chain in which its linking members are held spaced from one another so as to alleviate their binding together as when subjected to freezing conditions or through corrosion.

Flexible drive chains have long been available in the prior art, and are mainly formed through the pivotal connection of series of links held together for the purpose of providing for pivotal movement usually in one plane. In addition, and particularly where the link chain is formed to a greater size, they do find use in various forms of machinery and equipment where more durable forms of drives are needed, as in heavy construction equipment, street cleaning equipment, farm equipment, such as spreading apparatus for broadcasting fertilizer, lime, or the like. Chains of this nature which are usually incorporated in such equipment as a form of drive means are exposed to a variety of deteriorating conditions that can lead to their malfunctioning or eventual fatigue. For example, where these chains are used in the drive of heavy road building equipment, they are exposed to dirt and dust, frequently of the type that cakes upon the chain, in addition to being exposed to atmospheric conditions which may also lead to accelerated corrosion. The same is true of equipment that utilizes chains to augment their drive, such as the aforesaid farm equipment used in the agricultural field. Furthermore, many types of street cleaning equipment use the chain drive to drive auxiliary equipment, as for example, the salt spreaders that are employed for spreading salt on icy streets and roads and usually drive the spreading mechanism from a chain and sprocket combination driven from the main or auxiliary power source of the vehicle. Obviously, usage of the chain drive in conjunction with salt speeds up the onset of corrosion in its link chain.

The corrosion or freezing of chains utilized in conjunction with the foregoing type of equipment causes their malfunctioning, necessitating their early replacement, particularly in those instances where such chains are utilized in machines for spreading salt, or for use in the spreading of other agricultural chemicals in farming.

The principal object of this invention is to provide a link style chain which has enhanced use by segregating the deteriorative components of the chain.

A further object of this invention is to provide a link chain which can still function even after its discrete components have commenced rusting.

It is a further object of this invention to provide an improved chain which continues to be of greater service even after it has been exposed to icy conditions which normally causes freezing and its binding.

An additional object of this invention is to provide a link chain incorporating spacers which are substantially self-cleaning thereby insuring continued utility.

A further object of this invention is to provide a chain incorporating the aforesaid free floating washers which reduces friction and increases the pivotal motion of its links.

It is a further object of this invention to provide a link chain incorporating noncorroding washers and pivotal pin so as to separate from contact any of the corrosive linking elements or members utilized in the construction of the chain.

Another object of this invention is to provide a link chain which is simple to manufacture, having improved attributes, and which is reasonable in cost and of longer life.

These and other objects will become more apparent to those skilled in the art when reviewing the summary of this invention, and in studying the description of the preferred embodiment in view of the drawings.

SUMMARY OF THE INVENTION

This invention principally comprises the design of a chain formed of links, or which incorporates the usual linking members, which is generally constructed having alternate parallel pairs of linking members intervened by single linking members, all of these members being tied together through the use of pivotal or fastening pins. In addition, to the use of a linking pin or rivet which is noncorrosive, the invention further comprehends the addition of non-rusting spacers or washers maintained intermediate the surfaces of contiguous linking members, as for example, at the location where a single linking member is linked between the adjacent pairs of linking members, so that even if the linking members should commence to corrode, as through oxidation, they will not be able to bind together, or rust together into fusion, since the noncorrodible spacers and pivot pins segregate these components.

BRIEF DESCRIPTION OF THE DRAWINGS

In the drawings,

FIG. 1 provides a side view of the improved chain of this invention;

FIG. 2 provides a top view of the chain of this invention;

FIG. 3 provides a sectional view taken along the line 3—3 of FIG. 2;

FIG. 4 provides a side view of a slightly modified form of chain of this invention;

FIG. 5 provides a top view of the modified link chain shown in FIG. 4; and

FIG. 6 provides a sectional view taken along the line 6—6 of FIG. 5.

DESCRIPTION OF THE PREFERRED EMBODIMENT

In the drawings, the referring particularly to FIGS. 1 and 2, there is shown the chain A of this invention comprising a series of links, the link at 1 being a pair of parallel linking members 2 and 3, being arranged at alternate positions and intervened by the singular linking members 4. This type of chain may be used in a variety of ways and conditions as previously summarized, but principally will be employed as a chain drive frequently associated with drive and driven sprockets (not shown) for providing power to some particular component of machinery. These alternate links and intervening singular links are held together by a series of pins, as at 5, which are arranged through apertures provided proximate each end of contiguous linking members, and provides pivotal movement between each of the said links 1 and 4.

For cost reasons, the linking members 2, 3 and 4 are normally constructed of cast iron, steel, or related materials which have the usual attributes of providing high strength to a link chain of this nature, but, as previously described, the linking members constructed of these types of materials are generally exposed to corrosive conditions which cause their oxidation and eventual corroding together, which limits the freedom of pivotal movement between links, rendering the link chain eventually useless. To assist in alleviating the foregoing, the pins 5 are constructed of a non or low oxidizing material such as aluminum, copper, stainless steel, or other similar metal, so that the linking members when they corrode will not bind with such a pin. But in addition, there is a provided intermediate each linking member a spacer, as at 6, which also is constructed of a similar noncorroding material and prevents each of the linking members from also freezing or binding together at the shown locations.

By referring to FIG. 3, it can be seen that the spacers 6 may be constructed in the shape of the usual washer having an aperture provided centrally thereof to provide for insertion of the pin 5 therethrough when holding each of the linking members pivotally together. Hence, it can be seen from this Figure that all of those components of this link chain which may be subjected to corrosion or other deterioration are conveniently spaced apart from each other by means of a noncorrosive element, such as either the pivotal pins 5 or the spacers 6. The pivotal pin 5 may be peened over at either of its ends 7 to hold the components of adjacent links pivotally together.

While the pivotal pins 5 have been previously described as being preferably constructed of a noncorrosive metal, in those link chains of smaller caliber, and which are used in machinery of lesser magnitude, they might be constructed of a type of polymer of plastic, such as Teflon, so as to add to the flexibility of the pivotal movement between links of the chain constructed in this manner. In addition, these spacers 6 even in larger chains may be constructed of a polymer or Teflon to reduce the coefficient of friction between its links.

A slight modification to this invention is shown in FIGS. 4 through 6, wherein alternate links 8 are intervened by singular linking members 9, as aforesaid, with the pins 10 holding each link pivotally to the next adjacent link, and spacers 11 provide displacement of the linking members and prevent surface contact with contiguous linking members. The pivotal pins 10 and the spacers 11 are, once again, constructed of low frictional materials, and being noncorrosive, but the pin in this case is shown as having larger heads 12 to provide for secure fastening of the retention of the linking members together, and this pin may be constructed in the form of a nut and bolt arrangement which are threadably held together so as to provide quick removal as when it is desired to replace a defective link.

Numerous variations in the construction of the chain of this invention, within the scope of the appended claims, will occur to those skilled in the art in light of the foregoing disclosure. The described embodiments are merely illustrative of the principle of this invention, and any variations, as aforesaid, are intended to be covered in in the claims of any patent to issue thereon.

Having thus described the invention what is claimed and desired to be secured by Letters Patent is:

1. In a chain formed from a series of links, alternate links of said chain being formed of parallel dual linking members, and the intermediate links therebetween being formed as a single linking member, a pin holding each end of the alternate links pivotally to the proximate end of the next intermediate link, a spacer being arranged on the pin between each contiguous linking member to prevent their mutual contact, said spacer being relatively free for rotary movement with respect to the contiguous links, and each spacer and pin being formed of a noncorrosive material so as to prevent the links from being corroded or frozen together.

2. The invention of claim 1 wherein each spacer is formed as a washer.

3. The invention of claim 1 wherein each spacer is formed of a noncorrosive metal.

4. The invention of claim 3 wherein each pin is also formed of a noncorrosive metal, and whereby proximate linking members are held spaced from each other to alleviate their binding when subjected to detrimental conditions.

5. The invention of claim 1 wherein each pin is formed of a noncorrosive metal.

6. The invention of claim 1 wherein each spacer is formed of a polymer material.

7. The invention of claim 6 wherein the material is Teflon.

* * * * *